United States Patent Office 3,341,436
Patented Sept. 12, 1967

3,341,436
ELECTROLYTIC PROCESS FOR THE MANUFACTURE OF LINEAR POLYESTERS
Hans-Otto vom Orde, Bobingen, near Augsburg, Germany, assignor to Farbwerke Hoechst Aktiengesellschaft vormals Meister Lucius & Bruning, Frankfurt am Main, Germany
No Drawing. Filed July 30, 1963, Ser. No. 298,543
Claims priority, application Germany, July 31, 1962, F 37,475
10 Claims. (Cl. 204—59)

ABSTRACT OF THE DISCLOSURE

Process for manufacturing linear polyesters by contacting the reaction mixture comprising dicarboxylic acids and diols during ester interchange and/or polycondensation with two metal electrodes and producing current flow in the reaction mixture with direct current or with soluble or difficultly soluble catalysts of alkali metals, alkaline earth metals, Zn, Cd, Al, Sn, Pb, Bi, Ti, Zr, La, Mn or Co.

---

The present invention relates to a process for the manufacture of linear polyesters.

It is known to make linear polyesters by polycondensation of dicarboxylic acids and glycols. Advantageously, esters of dicarboxylic acids and lower alcohols are used as a starting material, the esters are subjected in a first reaction stage to an ester-interchange with glycol and the bis-glycol esters so obtained are polycondensed in a second reaction stage with splitting off of glycol to obtain polyesters of high molecular weight.

For accelerating the ester-interchange and the polycondensation, a large number of catalysts have been proposed which are soluble in the reaction medium. Some of these catalysts catalyze only one of the reaction stages, others catalyze both reaction stages. Exemplary of catalysts used for the ester-interchange are compounds of alkali or alkaline earth metals, or of zinc, cadmium, aluminium, tin, lead, bismuth, titanium, zirconium, lanthanum, manganese or cobalt. As a catalyst for the polycondensation, antimony trioxide has gained great importance.

It is also known that ester-interchange reactions are accelerated by difficultly soluble substances, for example metals which are less noble than hydrogen according to the electromotive series, or oxides of zinc, lead, lanthanum or cerium, double oxides or crushed alkali glass.

The aforesaid catalysts accelerate the ester-interchange, depending on the amount in which they are used or their surface area. They have the disadvantage, however, that the reaction products so obtained are already discolored by small admixtures of these catalysts. Larger admixtures of catalyst may affect the properties of the products obtained, which may be particularly disturbing in the work up of the products into fibers and filaments.

Now I have found that linear polyesters of dicarboxylic acids or their ester-forming derivatives and ethylene glycol or its condensed homologs can be obtained by contacting the reaction mixture with metal electrodes and producing a current flow in the reaction mixture by the application of direct current voltage, in order to accelerate the ester-interchange and/or the polycondensation.

In the process of the invention, the metal electrodes may consist of noble or not noble metals. Because of their capability to form alcoholates with alcohols, alkali metals are unsuitable for the process of the invention, although they may in principle be used as electrodes. In the process of the invention the following metals may be used, which have been indicated in the following enumeration in the order of the decreasing negative normal electrode potentials: barium, strontium, calcium, lanthanum, magnesium, yttrium, thorium, scandium, titanium, beryllium, aluminum, vanadium, niobium, manganese, chromium, zinc, iron, cadmium, indium, cobalt, nickel, molybdenum, tin, lead, bismuth, antimony, arsenic, copper, mercury, silver, palladium, irridium, platinum, gold or cerium.

The two electrodes to be used in the process of the invention may be of the same or of two different metals. If, as cathodes, electrodes of not noble metals are used, whose electrochemical normal potentials are more negative than those of the anodes, the metal content of the ester-interchange product is extraordinarily small owing to the deposition of ions at the cathode. Also metals, whose cations are not effective in the processes hitherto known, have an accelerating effect in the process of the invention. For example, copper electrodes accelerate the ester-interchange and the polycondensation in the electric field, although cuprous and cupric acetate have been of no use in the known ester-interchange processes.

The process of the invention enables shorter reaction times to be used for the ester-interchange and/or the polycondensation and yields products of improved qualities. By the polycondensation, melts of high viscosities are obtained; in the case of polyethylene terephthalates, for example, melts of a viscosity number $Z\eta$ of 0.07 (for $Z\eta$ cf. H. Staudinger "Kolloidchemie," 3rd edition 1950, page 210) determined at 25° C. in phenol tetrachlorethane (60:40). The products so obtained are distinguished by the fact that they are colorless, have very good storage properties and can be used for making fibers and filaments.

For the manufacture of linear polyesters by the process of the invention, dicarboxylic acids such as terephthalic acid, isophthalic acid or sebacic acid may be used either alone or in admixture with one another. Advantageously, the esters of these acids with lower alcohols, for example methanol, ethanol, butanol and propanol, are used. Exemplary of suitable glycols are ethylene glycol and diethylene glycol.

For carrying out the process of the invention, the reaction mixture is contacted with the surfaces of metal electrodes which consist either of two noble or two not noble metals of different or same type or of a not noble and a noble metal. The electrodes are connected to a direct voltage source (battery). A device for measuring the amperage and, if desired, a corresponding recording device are put into the circuit to determine the amount of current flowing through the arrangement.

In the process of the invention, it is furthermore possible to add ester-interchange and/or polycondensation catalysts known in themselves and then to produce a stronger electric current flow in the reaction mixture in the manner described above. In this case, that metal is advantageously used as a cathode which is less noble according to the electromotive series than the metal ion of the catalyst added and the corresopnding anode.

This arrangement has the advantage that most of the cations of the catalyst are deposited at the cathode and thus withdrawn from the reaction product. This mode of proceeding, too, enables the ester-interchange and/or the polycondensation to be considerably accelerated and yields a reaction product of high purity.

When, for example, zinc acetate is used as a catalyst and zinc is used for the anode, at least 65% of the zinc is separated at a magnesium cathode.

The following examples serve to illustrate the invention, but they are not intended to limit it thereto.

*Example 1*

In a round flask provided with an 18 cm. high top packed with filling bodies and a Liebig condenser (Jena apparatus glass) 194 grams terephthalic acid dimethyl ester, 186 grams anhydrous ethylene glycol and a boiled-out boiling stone were placed, and the flask was immersed up to the neck in a hot oil bath of 195° C. A copper sheet, having an average immersion surface of twice 6.25 cm.$^2$, which served as the cathode, and a zinc sheet having the same immersion surfaces and serving as the anode, were introduced through two lateral tubes in a manner such that the distance between the electrodes was 7.2 cm. Immediately thereafter, the circuit from the electrodes to a battery of a terminal voltage of 9.9 volts was closed. The average current density at the copper electrode was 1.1 to 1.15 ma./dm.$^2$.

With additional external heating, the first drop of the distillate reached the receiver via the attached top and the Liebig condenser after a melting and starting time of 40 minutes. From that moment onward, the time of ester-interchange was counted. After an ester-interchange of 3½ hours, during which time the temperature was raised to 210° C. after 2½ hours and by another 15° C. after a further 30 minutes, the total amount of methanol calculated was obtained, in addition to 0.2% by volume of ethylene glycol. The ester-interchange product contained 0.0034% of zinc. No copper could be detected. The resulting bis-[β-hydroxyethyl]-terephthalate was freed from excess glycol by dissolving in and reprecipitating from boiling water and obtained in the form of white flakes melting at 109° C. in a yield of 92.8% of the calculated amount.

127.1 grams of the bis-[β-hydroxyethyl]-terephthalate were introduced into an evaporating vessel of apparatus glass poor in alkali, having a capacity of about 500 cc. and an outside diameter of 6.6 cm. Through a tube disposed in the upper part of this vessel, which can be particularly well used for the heat transfer in viscous melts, the supply line for an antimony anode was introduced and fused in such a manner that the distance between the anode and a spiral stirrer of stainless steel, serving as the cathode, was 0.7 cm. The device was furthermore provided with an attachment, thermometer, descending cooler and a manometer. The air between the bis-[β-hydroxyethyl]-terephthalate flakes was displaced by nitrogen. Then a reduced pressure of 30 mm. of mercury was applied and the vessel was heated with the help of an air bath. As soon as the product was completely molten, the circuit of direct current from the antimony anode and the stirrer serving as the cathode to a battery of a terminal voltage of 5.7 volts was closed. Stirring was started (67 r.p.m.) and the temperature was increased to 225° C. within 30 minutes with the help of the heating device, while simultaneously further reducing the pressure. The melt was kept for a further 30 minutes at 250° C. under a pressure of 8 mm. of mercury and finally for a further 2 hours at a temperature of 285° C. under a pressure of 0.7 mm. of mercury.

The viscosity number Z$\eta$ increased so as to amount to 0.0075 in a sample taken after a reaction time of 48 minutes and to 0.013 in a sample taken after a reaction time of 71 minutes. The current strength in the reaction medium decreased to 0 after about 60 minutes, its mean value was 0.02 milliampere. The loss in weight at the anode amounted to 10.3 milligrams antimony metal. The melt was colorless, solidified at 260° C. and had a viscosity number of 0.069.

Example 2

In the manner described in Exomple 1, 194 grams terephthalic acid dimethyl ester were subjected to an ester-interchange with 186 grams anhydrous ethylene glycol, while adding 109.7 milligrams zinc acetate dihydrate, corresponding to 32.69 milligrams zinc ions or $5 \times 10^{-4}$ mols per mol dimethyl terephthalate. As the cathode a magnesium rod of an average immersion surface of 7.6 cm.$^2$ and as the anode a zinc sheet, having an average immersion surface of twice 6.5 cm.$^2$, were used. The distance between the electrodes was 7.2 cm. at an external direct voltage of 5.7 volts. The average current density at the magnesium cathode amounted to 1.2 ma./dm.$^2$. After a melting and starting time of 15 minutes, the first drop of the distillate passed over. After a total reaction time of 3½ hours, during which time the temperature was increased as described above, the distillate contained 1.7% by volume of ethylene glycol in addition to 100% of the calculated amount of methanol. The ester-interchange product contained 0.004% of magnesium and 0.0076% of zinc. The increase in weight at the cathode amounted to 22.3 milligrams corresponding to 68.2% of deposit, calculated on the zinc ions added.

When 157.5 grams of the ester-interchange product, consisting of 127.1 grams bis-[β-hydroxyethyl]-terephthalate and 30.4 grams ethylene glycol, were polycondensed in the manner described in Example 1 with the use of an antimony anode, a colorless melt was obtained which contained 8.6 milligrams antimony metal, solidified at 262° C. and had a viscosity number of 0.071.

Example 3

In a round flask (Jena apparatus glass) provided with an 18 cm. high top packed with filling bodies and a condenser, 230.3 grams sebacic acid dimethyl ester, 186 grams anhydrous ethylene glycol and a boiled-out boiling stone were placed, and the flask was immersed up to the neck in an oil bath of 195° C. A zinc sheet of an average immersion surface of twice 10.6 cm.$^2$ serving as a cathode and an antimony rod of an average immersion surface of 13.4 cm.$^2$ serving as an anode were introduced through two lateral tubes in a manner such that the distance between the anode and the cathode was 7.2 cm. Immediately thereafter, the circuit to a battery of a terminal voltage of 2.9 volts was closed. The average current density at the zinc electrode was 0.2 to 0.22 ma./dm.$^2$. With additional external heating, the first drop of the distillate reached the receiver via the attached top and the Liebig condenser after a melting and starting time of 66 minutes. From that moment onward the time of ester-interchange was counted. After an ester interchange of 3½ hours, during which time the temperature was increased to 210° C. after 2½ hours and by another 15° C. after a further 30 minutes, the total amount of methanol calculated was obtained in the distillate, in addition to 5.3% by volume of ethylene glycol. The loss in weight of the cathode amounted to 32.9 milligrams and that of the anode to 10.4 milligrams. 347.4 grams of a mixture consisting of bis-[β-hydroxyethyl]-sebacate and 57 grams ethylene glycol were obtained.

173.7 grams of the solidified melt containing 145.2 grams bis-[β-hydroxyethyl]-sebacate and 28.5 grams excess ethylene glycol were comminuted and introduced into an evaporating vessel of apparatus glass poor in alkali which had a capacity of about 700 cc. and an outside diameter of 6.6 cm. Through a tube disposed in the upper part of this vessel, which can be particularly well used for the heat transfer in viscous melts, the supply line for a cadmium anode was introduced and fused in a manner such that the distance between the anode and a spiral stirrer of stainless steel serving as the cathode was 0.6 cm. The device was furthermore provided with an attachment, thermometer, descending cooler and manometer. The air between the particles of the mixture was displaced by nitrogen. Then a reduced pressure of 30 mm. of mercury was applied and the vessel was heated with the help of an air bath. As soon as the product was completely molten, the circuit of direct current from the cadmium anode and the stirrer serving as the cathode to a battery of a terminal voltage of 2.9 volts was closed. Stirring was started (67 r.p.m.) and the temperature was increased to 225° C. within 30 minutes with the help of the heating device, while simultaneously further reducing the pressure. The melt was kept for a further 30 minutes at 250° C. under a pressure of 8 mm. of mercury and finally for a further two hours at a temperature of 285° C. under a pressure of 0.7 mm. of mercury. Already after 30 minutes the current strength in the reaction medium decreased to 0; the average value of the current strength amounted to 0.022 milliampere. The loss in weight at the anode amounted to 9.7 milligrams cadmium metal. The melt was colorless, solidified at a temperature within the range of 82 to 84° C. and had a viscosity number of 0.093.

*Example 4*

In a round flask (Jena apparatus glass) provided with an 18 cm. high top packed with filling bodies and a Liebig condenser, 194 grams isophthalic acid dimethyl ester, 186 grams anhydrous ethylene glycol and a boiled-out boiling stone were placed, and the flask was immersed up to the neck in an oil bath of 195° C. A magnesium rod having an average immersion surface of 7.5 cm.$^2$ and serving as a cathode and a zinc sheet having an average immersion surface of twice 6.5 cm.$^2$, which served as an anode, were introduced through two lateral tubes in a manner such that the distance between the electrodes was 7.2 cm. The terminal voltage of the direct current source was 9.9 volts. The average current density at the magnesium electrode was 3.75 ma./dm.$^2$. With additional external heating, the first drop of the distillate reached the receiver via the attached top and the Liebig condenser after a melting and starting time of 47 minutes. From that moment onward the time of ester-interchange was counted. After an ester-interchange of 3½ hours, during which time the temperature was raised to 210° C. after 2½ hours and by another 15° C. after a further 30 minutes, the total amount of methanol calculated was obtained, in addition to 1.7% by volume of ethylene glycol. The ester-interchange product contained 0.0031% of zinc and 0.0022% of magnesium.

When 157.5 grams of ester-interchange product consisting of 127.1 grams bis-[β-hydroxyethyl]-isophthalate and 30.4 grams ethylene glycol were polycondensed in the manner described in Example 1 with the use of an antimony anode, a colorless melt was obtained which contained 20.2 milligrams antimony metal, solidified at a temperature within the range of 98 to 100° C. and had a viscosity number of 0.039.

*Example 5*

In a round flask provided with an 18 cm. high top packed with filling bodies and a descending cooler, 194 grams dimethyl terephthalate, 318 grams diethylene glycol and a boiled-out boiling stone were placed and the flask was immersed up to the neck into an oil bath of 195° C. A zinc sheet, having an average immersion surface of twice 13.2 cm.$^2$ and serving as an anode and a copper sheet having an average immersion surface of twice 12.5 cm.$^2$ and serving as a cathode were introduced through two lateral tubes in a manner such that the distance between the electrodes amounted to 10.2 cm. Immediately thereafter the circuit to a direct current source of a terminal voltage of 9.9 volts was closed. The average current density at the copper cathode was 0.5 ma./dm.$^2$. With additional external heating, the first drop of the distillate reached the receiver after a melting and starting time of 29 minutes. From that moment onward the time of ester-interchange was counted. After an ester-interchange of 3½ hours, during which time the temperature was increased as described above, the total amount of methanol calculated was obtained in admixture with 2.4 cc. diethylene glycol. The loss in weight of the cathode amounted to 8.5 milligrams and that of the anode to 13.7 milligrams. 445.4 grams of a mixture consisting of 342.2 grams diester of terephthalic acid with diethylene glycol and an excess amount of diethylene glycol were obtained.

222.7 grams of the solidified melt containing 171.1 grams diester were comminuted and introduced into an evaporating vessel of apparatus glass poor in alkali having a capacity of about 700 cc. and an outside diameter of 6.6 cm. through a tube in the upper part of the vessel, a supply line for an antimony anode was introduced and fused in such a manner that the distance from the anode to a spiral stirrer of stainless steel which served as a cathode amounted to 0.6 cm. The device was furthermore provided with an attachment, thermometer, condenser and a manometer. The air between the particles of the mixture was displaced by nitrogen. Then a reduced pressure of 30 mm. of mercury was applied and the vessel was heated with the help of an air bath. As soon as the product was completely molten, the circuit of direct current from the antimony anode and the stirrer serving as the cathode to a battery of a terminal voltage of 9.9 volts was closed. Stirring was started and the temperature was increased to 225° C. within 30 minutes with the help of the heating device while simultaneously further reducing the pressure. The melt was kept for a further 30 minutes at 250° C. under a pressure of 8 mm. of mercury and finally for a further two hours at a temperature of 285° C. under a pressure of 0.7 mm. of mercury. The loss in weight at the anode amounted to 11.2 milligrams antimony metal. 115 grams of a colorless melt were obtained. The melt had a solidification point within the range of 62 to 69° C. and a viscosity number of 0.035.

I claim:

1. In the process for the manufacture of linear polyesters of dicarboxylic acids and diols comprising the steps of (a) subjecting esters of dicarboxylic acids and lower aliphatic alcohols to ester interchange with diols and (b) subsequent polycondensation, the improvement comprising contacting the reaction mixture in at least one of steps (a) or (b) with two metal electrodes and producing a current flow in the reaction mixture by the application of direct current voltage.

2. The process of claim 1 wherein the reaction mixture in both steps (a) and (b) is contacted with electrodes.

3. The process of claim 1 wherein the reaction mixture in step (a) is contacted with the electrodes.

4. The process of claim 1 wherein the reaction mixture in step (b) is contacted with the electrodes.

5. The process of claim 1 in which, as a cathode, a metal is used which is less noble according to the electromotive series than the metal used for the anode.

6. The process of claim 1 in which known polycondensation catalysts are added to the reaction mixture.

7. The process of claim 2 wherein known catalysts for the ester-interchange and the polycondensation are added to the reaction mixture.

8. The process of claim 3 in which known catalysts for the ester-interchange are added to the reaction mixture.

9. The process of claim 4 wherein known polycondensation catalysts are added to the reaction mixture.

10. The process of claim 2 in which zinc acetate is added to the reaction mixture, the latter is contacted with a zinc anode and a magnesium cathode and a current flow is produced in the reaction mixture.

References Cited

UNITED STATES PATENTS 2,439,425   4/1948   Gresham _____ 204—72
2,929,786   3/1960   Young et al. _____ 260—485

JOHN H. MACK, *Primary Examiner.*

HOWARD S. WILLIAMS, *Examiner.*

D. R. VALENTINE, *Assistant Examiner.*